US009301296B2

(12) United States Patent
Li et al.

(10) Patent No.: US 9,301,296 B2
(45) Date of Patent: Mar. 29, 2016

(54) METHODS AND APPARATUS FOR MULTI-CARRIER COMMUNICATION SYSTEMS WITH ADAPTIVE TRANSMISSION AND FEEDBACK

(71) Applicant: Neocific, Inc., Bellevue, WA (US)

(72) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 0 days.

(21) Appl. No.: 14/539,917

(22) Filed: Nov. 12, 2014

(65) Prior Publication Data

US 2015/0139177 A1    May 21, 2015

Related U.S. Application Data

(63) Continuation of application No. 13/246,677, filed on Sep. 27, 2011, now abandoned, which is a continuation of application No. 12/755,313, filed on Apr. 6, 2010, now Pat. No. 8,027,367, which is a continuation of application No. 10/583,529, filed as application No. PCT/US2005/004601 on Feb. 14, 2005, now Pat. No. 7,693,032.

(60) Provisional application No. 60/544,521, filed on Feb. 13, 2004.

(51) Int. Cl.
*H04B 7/00* (2006.01)
*H04W 72/04* (2009.01)
(Continued)

(52) U.S. Cl.
CPC ........... *H04W 72/044* (2013.01); *H04B 7/0413* (2013.01); *H04L 1/0026* (2013.01); *H04L 1/0029* (2013.01); *H04L 1/0068* (2013.01); *H04L 1/0073* (2013.01); *H04L 5/006* (2013.01); *H04L 5/0046* (2013.01); *H04L 5/0048* (2013.01); *H04L 27/2608* (2013.01); *H04L 1/0003* (2013.01); *H04L 1/0009* (2013.01);
(Continued)

(58) Field of Classification Search
CPC ..................... H04W 56/001; H04W 56/0025
USPC .......... 370/310, 328, 349, 350, 431, 436, 458
See application file for complete search history.

(56) References Cited

U.S. PATENT DOCUMENTS 5,825,807 A  10/1998 Kumar
5,828,695 A  10/1998 Webb
(Continued)

FOREIGN PATENT DOCUMENTS

KR  20010083789   9/2001
KR  20030085074  11/2003
(Continued)

OTHER PUBLICATIONS

"International Search Report and Written Opinion, International Application No. PCT/US05/04601, Mail Date Jun. 7, 2005, 9 pages."
(Continued)

*Primary Examiner* — Dmitry H Levitan
(74) *Attorney, Agent, or Firm* — Perkins Coie LLP

(57) ABSTRACT

An arrangement is disclosed where in a multi-carrier communication system, the modulation scheme, coding attributes, training pilots, and signal power may be adjusted to adapt to channel conditions in order to maximize the overall system capacity and spectral efficiency without wasting radio resources or compromising error probability performance, etc.

25 Claims, 8 Drawing Sheets

(51) Int. Cl.
   *H04L 27/26*   (2006.01)
   *H04B 7/04*   (2006.01)
   *H04L 1/00*   (2006.01)
   *H04L 5/00*   (2006.01)
   *H04W 52/26*   (2009.01)

(52) U.S. Cl.
   CPC ............ *H04L5/0007* (2013.01); *H04L 5/0091* (2013.01); *H04W 52/26* (2013.01)

(56) References Cited

U.S. PATENT DOCUMENTS

| | | | |
|---|---|---|---|
| 5,867,478 | A | 2/1999 | Baum et al. |
| 6,014,550 | A * | 1/2000 | Rikkinen ............... H04W 52/54 455/63.1 |
| 6,400,783 | B1 | 6/2002 | Cusani |
| 6,480,558 | B1 | 11/2002 | Ottoson |
| 6,515,960 | B1 | 2/2003 | Usui et al. |
| 6,567,383 | B1 | 5/2003 | Bohnke |
| 6,643,281 | B1 | 11/2003 | Ryan |
| 6,654,429 | B1 * | 11/2003 | Li ............................ H04L 1/06 370/252 |
| 6,731,673 | B1 | 5/2004 | Kotov et al. |
| 6,741,578 | B1 | 5/2004 | Moon et al. |
| 6,847,678 | B2 | 1/2005 | Berezdivin et al. |
| 6,904,550 | B2 | 6/2005 | Sibecas et al. |
| 6,922,388 | B1 | 7/2005 | Laroia et al. |
| 6,940,827 | B2 | 9/2005 | Li et al. |
| 7,035,663 | B1 | 4/2006 | Linebarger et al. |
| 7,039,001 | B2 | 5/2006 | Krishnan et al. |
| 7,062,002 | B1 | 6/2006 | Michel et al. |
| 7,123,934 | B1 | 10/2006 | Linebarger et al. |
| 7,161,985 | B2 | 1/2007 | Dostert et al. |
| 7,248,559 | B2 * | 7/2007 | Ma ........................... H04B 7/04 370/208 |
| 7,257,423 | B2 | 8/2007 | Iochi |
| 7,260,054 | B2 | 8/2007 | Olszewski |
| 7,289,494 | B2 | 10/2007 | Lakkis |
| 7,304,939 | B2 | 12/2007 | Steer et al. |
| 7,317,702 | B2 | 1/2008 | Dominique et al. |
| 7,333,457 | B2 | 2/2008 | Gopalakrishnan et al. |
| 7,386,055 | B2 | 6/2008 | Morita et al. |
| 7,388,847 | B2 | 6/2008 | Dubuc et al. |
| 7,403,513 | B2 | 7/2008 | Lee et al. |
| 7,403,556 | B2 | 7/2008 | Kao et al. |
| 7,418,042 | B2 | 8/2008 | Choi et al. |
| 7,436,757 | B1 * | 10/2008 | Wilson .................. H04L 5/0058 370/203 |
| 7,437,166 | B2 | 10/2008 | Osseiran et al. |
| 7,443,829 | B2 | 10/2008 | Rizvi et al. |
| 7,492,722 | B2 | 2/2009 | Pietraski et al. |
| 7,555,268 | B2 | 6/2009 | Trachewsky et al. |
| 7,567,624 | B1 | 7/2009 | Schmidl et al. |
| 7,619,963 | B2 * | 11/2009 | Abe ....................... H04L 5/006 370/208 |
| 7,646,747 | B2 | 1/2010 | Atarashi et al. |
| 7,680,094 | B2 | 3/2010 | Liu |
| 7,693,032 | B2 | 4/2010 | Li et al. |
| 7,697,466 | B2 | 4/2010 | Hashimoto et al. |
| 7,724,720 | B2 | 5/2010 | Korpela et al. |
| 7,738,437 | B2 | 6/2010 | Ma et al. |
| 7,864,725 | B2 | 1/2011 | Li et al. |
| 7,864,739 | B2 | 1/2011 | Atarashi et al. |
| 7,907,592 | B2 | 3/2011 | Han et al. |
| 7,912,490 | B2 | 3/2011 | Pietraski |
| 8,009,660 | B2 | 8/2011 | Li et al. |
| 8,018,902 | B2 | 9/2011 | Wintzell |
| 8,027,367 | B2 | 9/2011 | Li et al. |
| 8,094,611 | B2 | 1/2012 | Li et al. |
| 8,179,833 | B2 | 5/2012 | Attar et al. |
| 8,428,009 | B2 | 4/2013 | Li et al. |
| 2005/0002369 | A1 * | 1/2005 | Ro ........................ H04B 1/7083 370/342 |

FOREIGN PATENT DOCUMENTS

| | | |
|---|---|---|
| KR | 20040055517 | 6/2004 |
| KR | 20060007481 | 1/2006 |

OTHER PUBLICATIONS

"International Search Report and Written Opinion, PCT Application No. PCT/US05/03518; Filed Jan. 27, 2005; Applicant: Waltical Solutions, Inc.; Mailed: May 23, 2005; 8 pages."

"International Search Report and Written Opinion; PCT Application No. PCT/US05/01939; Filed Jan. 20, 2005; Applicant: Waltical Solutions, Inc.; Mailed Apr. 26, 2005; 7 pages."

"Simeone, et al. Adaptive pilot pattern for OFDM systems. IEEE Communications Society .RTM. 2004 IEEE, 5 pages", Jun. 2004.

* cited by examiner

METHODS AND APPARATUS FOR MULTI-CARRIER COMMUNICATION SYSTEMS WITH ADAPTIVE TRANSMISSION AND FEEDBACK

CROSS-REFERENCE TO RELATED APPLICATION(S)

This application is a continuation application of, and incorporates by reference in its entirety, U.S. patent application Ser. No. 13/246,677, filed Sep. 27, 2011, which is a continuation application of U.S. patent application Ser. No. 12/755,313, now granted U.S. Pat. No. 8,027,367, filed Apr. 6, 2010, which is a continuation application of U.S. patent application Ser. No. 10/583,529, now granted U.S. Pat. No. 7,693,032, having a 371 date of May 10, 2007, which is a national stage application of International Application No. PCT/US2005/004601, filed Feb. 14, 2005, which claims the benefit of U.S. Provisional Patent Application No. 60/544,521, filed Feb. 13, 2004. This application also relates to PCT Application No. PCT/US05/03518 titled "Methods and Apparatus for Overlaying Multi-Carrier and Direct Sequence Spread Spectrum Signals in a Broadband Wireless Communication System," filed Jan. 27, 2005, which claims the benefit of U.S. Provisional Application No. 60/540,032 filed Jan. 29, 2004 and U.S. Provisional Application No. 60/540,586 filed Jan. 30, 2004.

BACKGROUND

Adaptive modulation and coding (AMC) has been used in wireless systems to improve spectral efficiency in a fading environment where signal quality varies significantly. By adjusting the modulation and coding scheme (MCS) in accordance with the varying signal-to-interference-plus-noise ratio (SINR), reliable communication link can be maintained between communicating devices. For example, in CDMA2000 1×EV-DO system, twelve different modulation/coding schemes are provided. AMC is also used in CDMA2000 1×EV-DV and 3GPP HSDPA systems.

To improve performance, in addition to the MCS, other system functions such as channel estimation, transmission power control (TPC), and subchannel configuration can be adjusted in accordance with the state of the communication channel. For example, channel estimation typically utilizes training symbols or pilot data, which are known to both the transmitter and the receiver. For coherent modulation, the channel information can be extracted at the receiver by comparing the pilots and their corresponding received versions. For non-coherent modulation, the received samples of the pilots are used as reference for the detection of the transmitted data.

Channel estimation is an important part of multi-carrier (MC) communication systems such as Orthogonal Frequency Division Multiplexing (OFDM) systems. In conventional OFDM systems, such as IEEE802.11a, 802.11g, 802.16, or DVB-T system, pilots are transmitted for channel estimation. The pilots are fixed and form part of other functions such as MCS, TPC, and subchannel configuration in some wireless systems.

Fast TPC can compensate for fast fading. In a multi-cell multiple-access system, TPC is also used to reduce intra-cell and inter-cell interference and to conserve battery life for the mobile station by transmitting with only necessary power. TPC is one of many functions in some wireless systems, along with MCS, pilot attributes, subchannel configuration, etc.

The subchannel configuration is normally defined and fixed in an operation, and it is usually not considered an adjustable function of the system to be adapted to the user profile and/or operational environment.

DETAILED DESCRIPTION

Methods and apparatus for adaptive transmission of wireless communication signals are described, where MCS (modulation and coding scheme), coding rates, training pilot patterns, TPC (transmission power control) levels, and subchannel configurations are jointly adjusted to adapt to the channel conditions. This adaptation maximizes the overall system capacity and spectral efficiency without wasting radio resources or compromising error probability performance.

Furthermore, the subchannel composition is designed to be configurable so that it can be adjusted statically or dynamically according to the user profiles or environmental conditions. The methods for obtaining the channel information and for transmitting the control information in the joint adaptation scheme are also described below, such as feedback of channel condition and indexing of the joint scheme, along with methods for reducing the overhead of messaging.

The mentioned multi-carrier system can be of any special format such as OFDM, or Multi-Carrier Code Division Multiple Access (MC-CDMA) and can be applied to downlink, uplink, or both, where the duplexing technique is either Time Division Duplexing (TDD) or Frequency Division Duplexing (FDD).

The apparatus and methods are described with respect to various embodiments and provide specific details for a thorough understanding and enablement. One skilled in the art will understand that the invention may be practiced without such details. In some instances well-known structures and functions are not shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
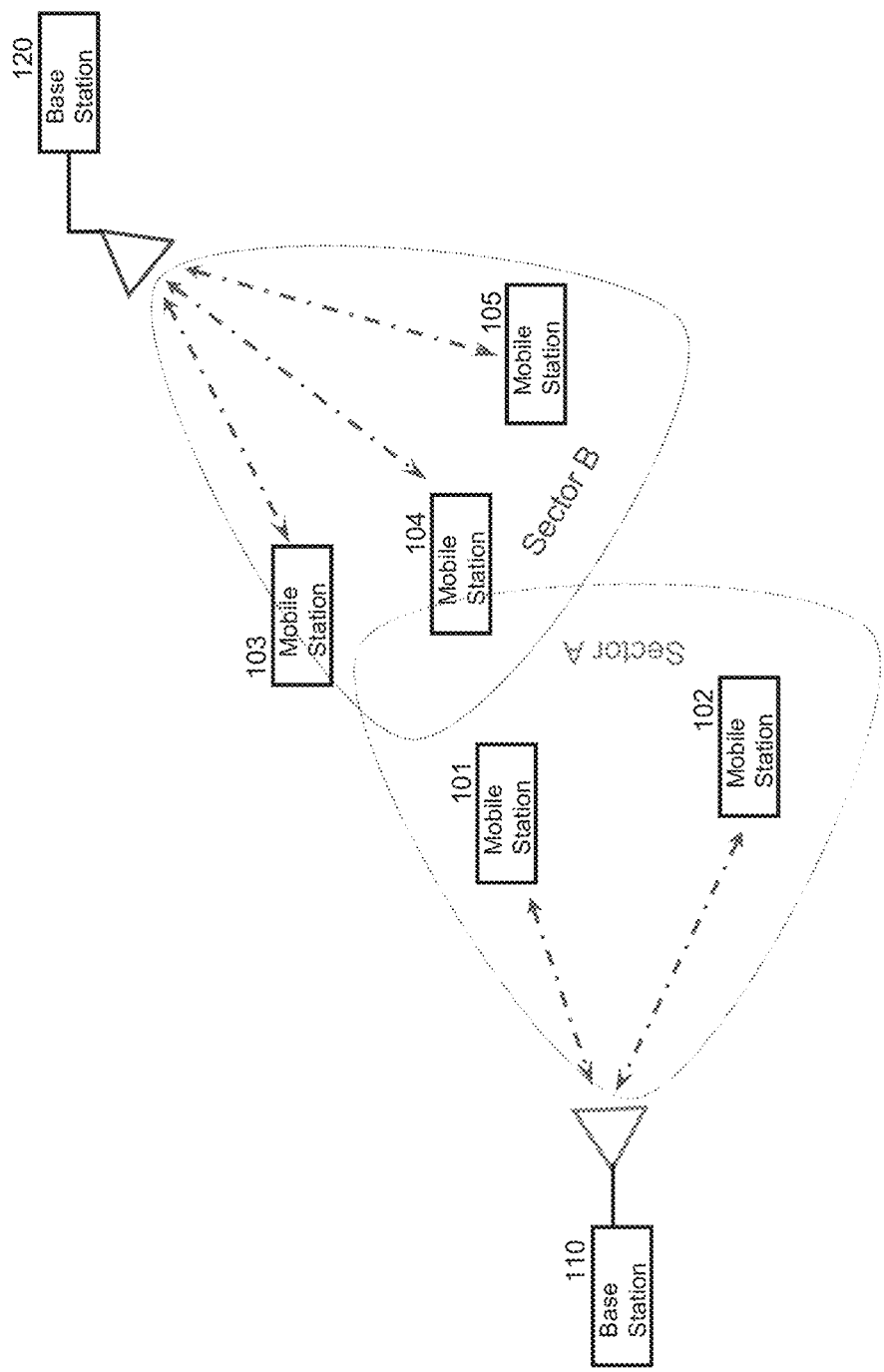
FIG. 1 is a representative cellular communication system.

The content of this description is applicable to a communication system with multiple transmitters and multiple receivers. For example, in a wireless network, there are a number of base stations, each of which provides coverage to its designated area, typically called a cell. Within each cell, there are mobile stations. FIG. 1 illustrates a communication system that is representative of such a system, where Base Station 110 is communicating with Mobile Stations 101 and 102 in Sector A of its cell site while Base Station 120 is communicating with Mobile Stations 103, 104, and 105 in Sector B of its cell site.

A multi-carrier multiple-access system is a special case of general communication systems and hereinafter is employed as a representative communication system to describe the embodiments of the invention.

Multi-Carrier Communication System

The physical media resource (e.g., radio or cable) in a multi-carrier communication system can be divided in both the frequency and the time domains. This canonical division provides a high flexibility and fine granularity for resource sharing.

The basic structure of a multi-carrier signal in the frequency domain is made up of subcarriers. Within a particular spectral band or channel, there are a fixed number of subcarriers, and there are three types of subcarriers:

1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard bands and DC carrier.

Figure 2:
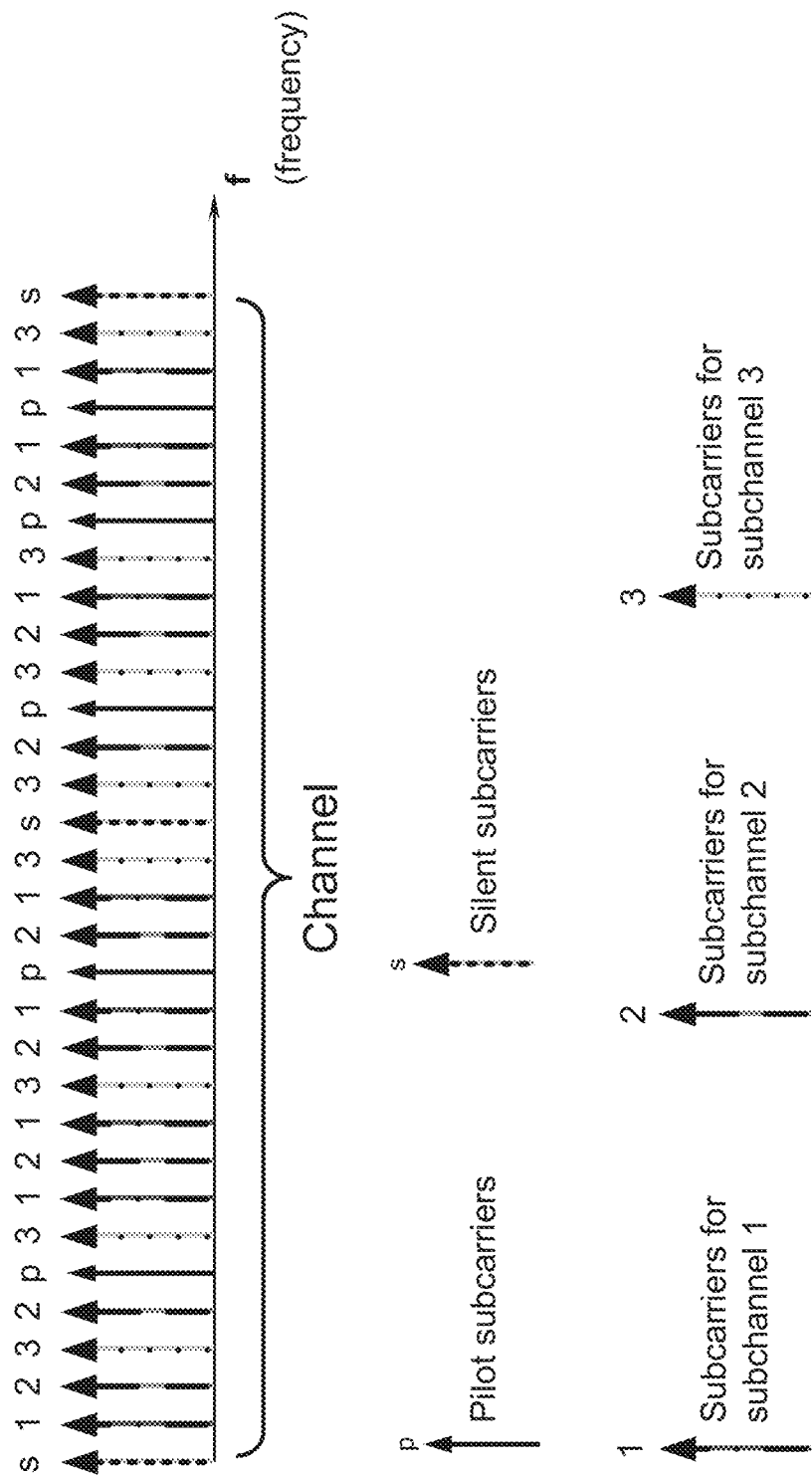
FIG. 2 is a basic structure of a multi-carrier signal in the frequency domain, made up of subcarriers.

The data subcarriers can be arranged into groups called subchannels to support scalability and multiple-access. The carriers forming one subchannel are not necessarily adjacent to each other. Each user may use part or all of the subchannels. The concept is illustrated in FIG. 2, which is the basic structure of a multi-carrier signal in the frequency domain, made up of subcarriers. Data subcarriers can be grouped into subchannels in a specified manner. The pilot subcarriers are also distributed over the entire channel in a specified manner.

Figure 3:
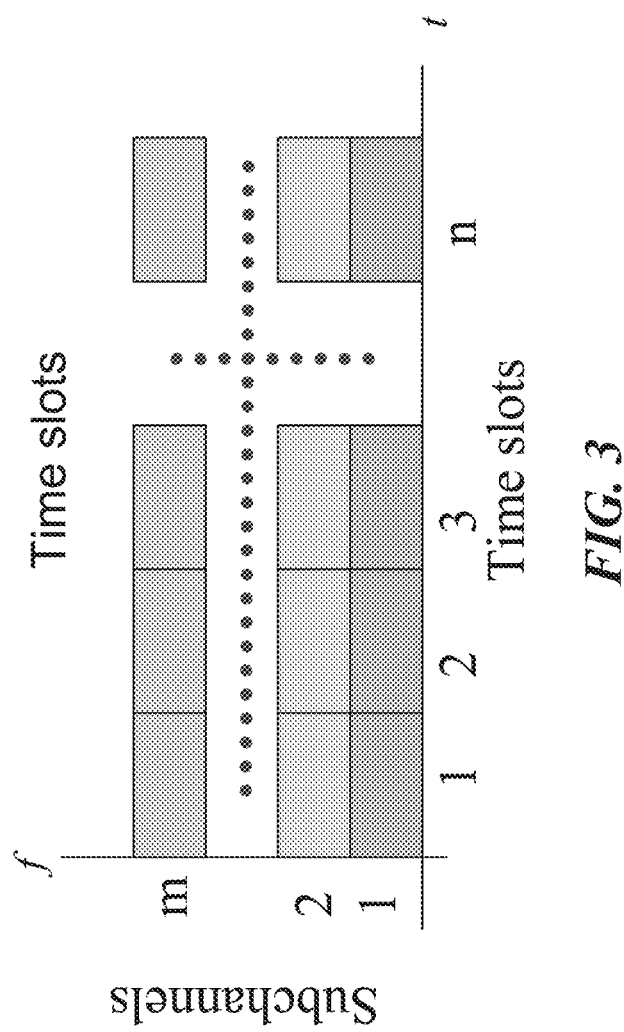
FIG. 3 depicts a radio resource divided into small units in both frequency and time domains: subchannels and time slots.

The basic structure of a multi-carrier signal in the time domain is made up of time slots to support multiple-access. The resource division in both the frequency and time domains is depicted in FIG. 3, which is the radio resource divided into small units in both the frequency and time domains (subchannels and time slots). The basic structure of a multi-carrier signal in the time domain is made up of time slots.

Adaptive Transmission and Feedback

The underlying principles of adaptive transmission and feedback are both to increase the degree of freedom of a transmission process and to supply information for the adaptation process of a communication system. The adaptation process adjusts the allocated modulation schemes, coding rates, pilot patterns, power levels, spatial processing schemes, subchannel configurations, etc. in accordance with the transmission channel state and condition, for improving system performance and/or capacity.

Below, AMCTP (adaptive modulation, coding, training and power control) is used as a general term, where its variations can be applied to appropriate applications. There are different adaptive transmission schemes that are subsets of the AMCTP scheme, such as AMCT (adaptive modulation, coding and training), AMTP (adaptive modulation, training, and power control), AMT (adaptive modulation and training), and so forth.

Figure 4:
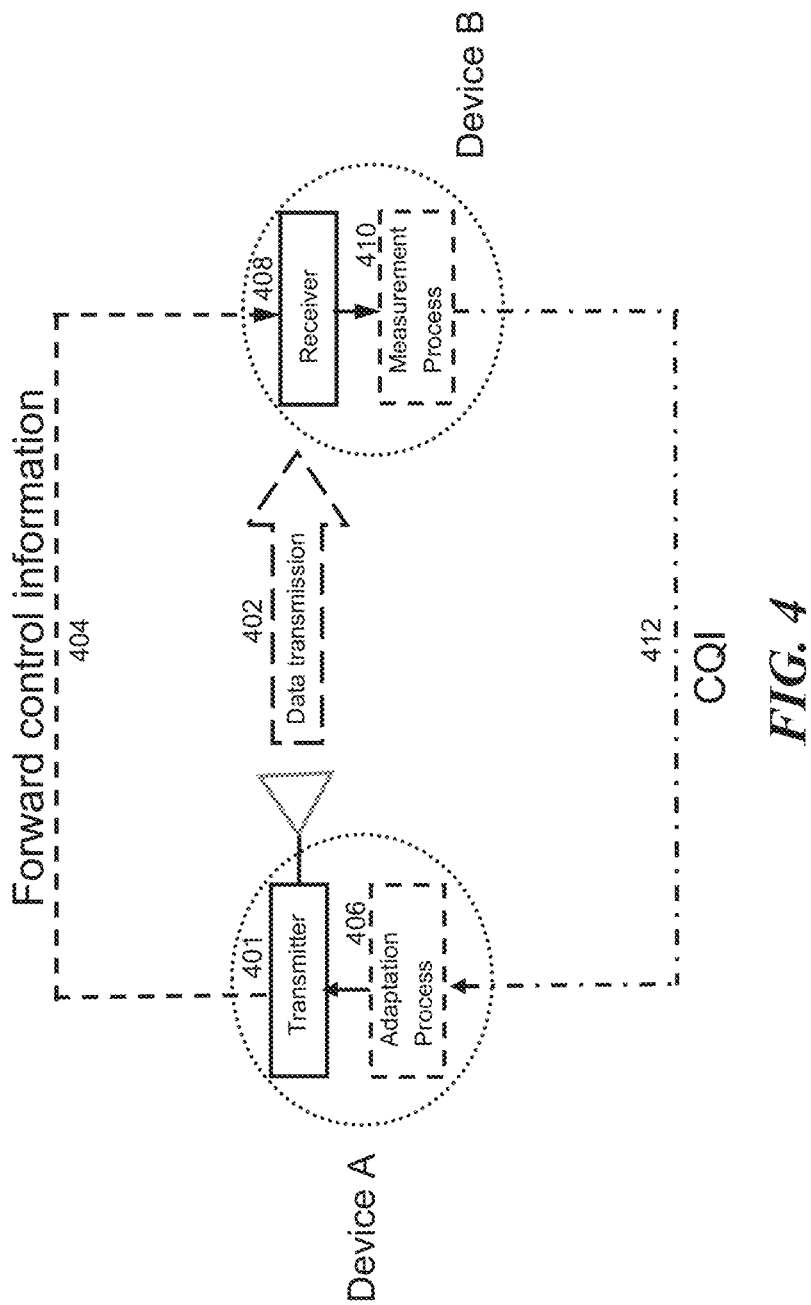
FIG. 4 is an illustration of a control process between Device A and Device B, each of which can be a part of a base station and a mobile station depicted in FIG. 1.

FIG. 4 is an illustration of the control process between Device A and Device B, each of which can be a part of a base station and a mobile station depicted in FIG. 1, during adaptive transmission. The transmitter 401 of Device A transmits data 402 and associated control information 404 to Device B, based on an output of the adaptation process 406. After a receiver 408 of Device B receives the transmitted data 402 and control information 404, a measurement process 410 of Device B measures a channel conditions and feeds a channel quality information (CQI) 412 back to Device A.

The granularity of AMCTP schemes in a multi-carrier system can be user-based, where one or multiple subchannels may be used, or the granularity can be subchannel-based, where a subchannel may contain one or more subcarriers. Likewise, the granularity of CQI can be user- or subchannel-based. Both AMCTP and CQI may change over time and may differ from one time slot to another.

Figure 5:
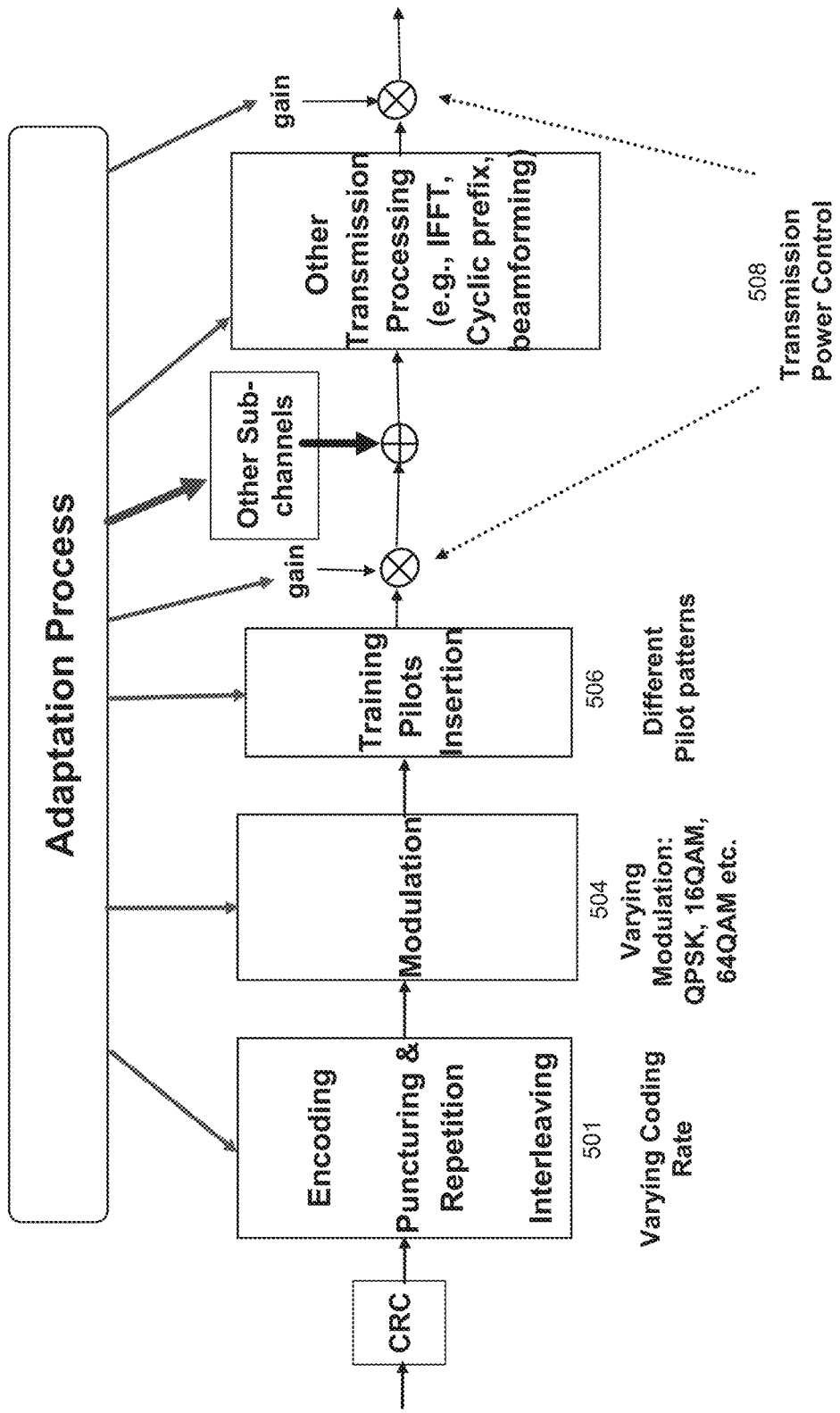
FIG. 5 illustrates a joint adaptation process at a transmitter of an OFDM system which controls coding, modulation, training pilot pattern, and transmission power for a subchannel.

FIG. 5 illustrates a joint adaptation process at a transmitter of an OFDM system which employs separate processing block to control the coding 502, modulation 504, training pilot pattern 506, and transmission power for a subchannel 508. Each block may be implemented combined or separately in circuitry, in dedicated processors, in a digital signal processor, as a microprocessor implemented subroutine, etc.

Figure 6:
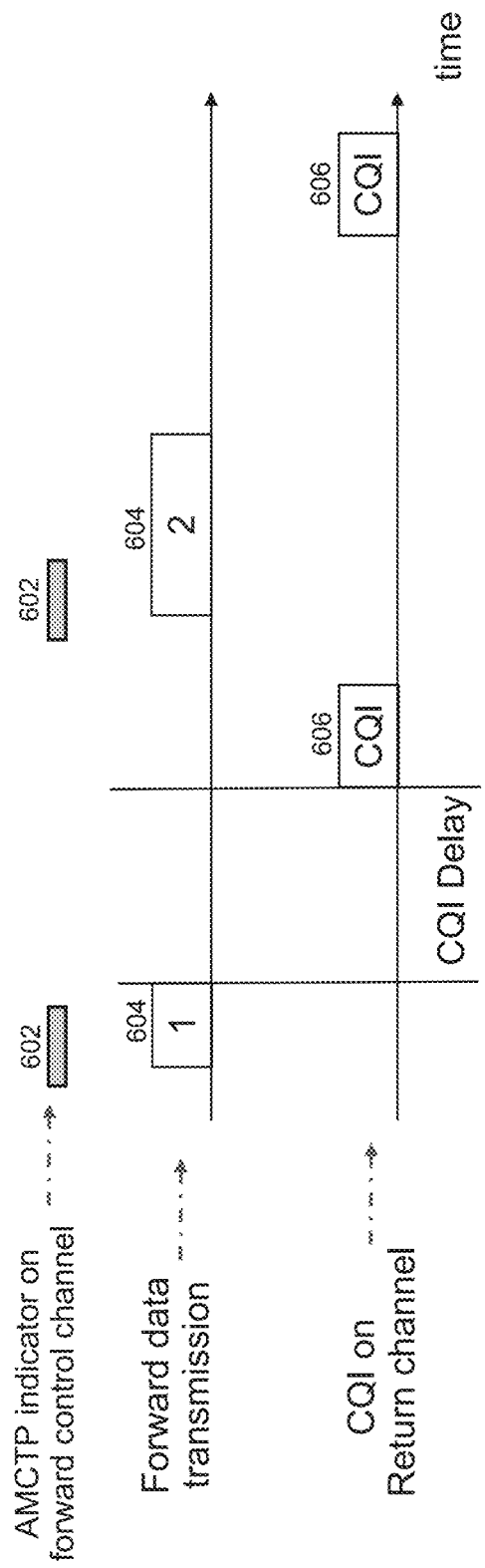
FIG. 6 is an illustration of a control messaging associated with data transmission between communication devices.

FIG. 6 is an illustration of control messaging associated with the data transmission between communication devices, such as Device A and B in FIG. 4. In FIG. 6 the AMCTP indicator 602 is associated with data transmission 604 on a forward link from the transmitter to the receiver, and CQI 606 is associated with the information feedback from the receiver to the transmitter on a return channel.

In a system where AMCTP is used, the transmitter relies on the CQI to select an appropriate AMCTP scheme for transmitting the next packet, or retransmitting a previously failed packet, required in an automatic repeat request (ARQ) process. The CQI is a function of one or more of the following: received signal strength; average SINR; variance in time; frequency or space; measured bit error rate (BER); frame error rate (FER); or mean square error (MSE). Channel conditions hereinafter are referred to as one or more of the following, for a user or a subchannel: signal level, noise level, interference level, SINR, fading channel characteristics (Doppler frequency, delay spread, etc.), or channel profile in time or frequency domain. The detection of the channel condition can be at the transmitter, the receiver, or both.

An MCS in AMCTP is referred to as a modulation and error correction coding scheme used in the system. By matching an MCS to a specific channel condition (e.g., SINR level), a better throughput is achieved. Varying only the MCS is a sub-optimal approach since other factors such as training pilot patterns or subchannel compositions also impact system performance.

A pilot pattern includes the number of (training) pilot symbols, the location of the symbols in time/frequency/space, the amplitude and phase, and other attributes of these symbols. The system may use distinctive pilot patterns to suit different MCS and channel conditions. The pilot pattern requirements for a robust channel estimation vary with the SINR of the channel and the channel profile.

Figure 7:
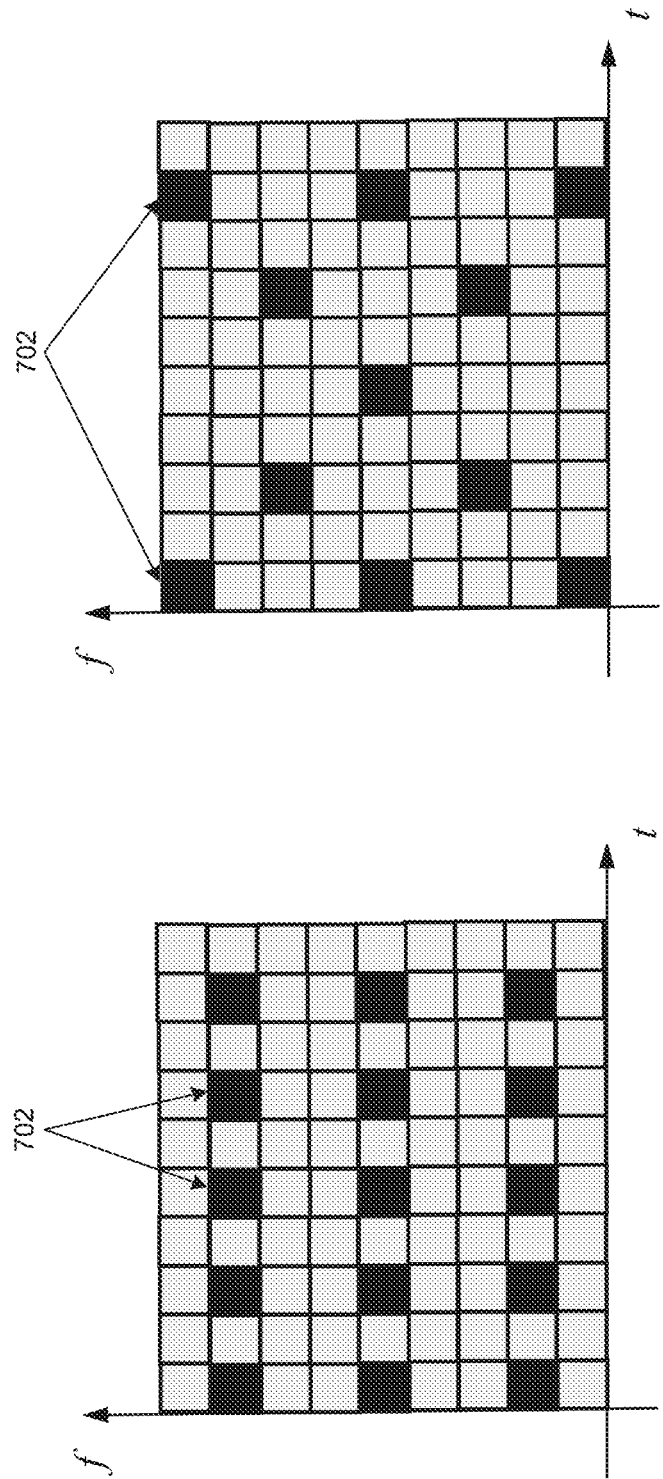
FIG. 7 illustrates two different training pilot patterns plotted for a multi-carrier system.

In a multi-carrier system, pilots are transmitted on certain positions in the time-frequency grid. FIG. 7 illustrates two of many different training pilot patterns that may be used, each plotted for a multi-carrier system, where the dark shaded time-frequency grids 702 are allocated as training pilot symbols. One criterion for choosing a pilot pattern is that the pilot assisted channel estimation should not be a bottleneck for the link performance, and that the pilot overhead should be kept to a minimum. The joined adaptation of training pilot pattern together with MCS is a more effective way of matching the channel conditions, and results in a better performance compared with a mere adaptation of MCS.

The power control information may include an absolute power level and/or a relative amount to increase or decrease the current power setting. In a multi-carrier system, the power levels of different subchannels are set differently such that minimum power is allocated to a subchannel to satisfy its performance requirements while minimizing interference to other users.

Figure 8:
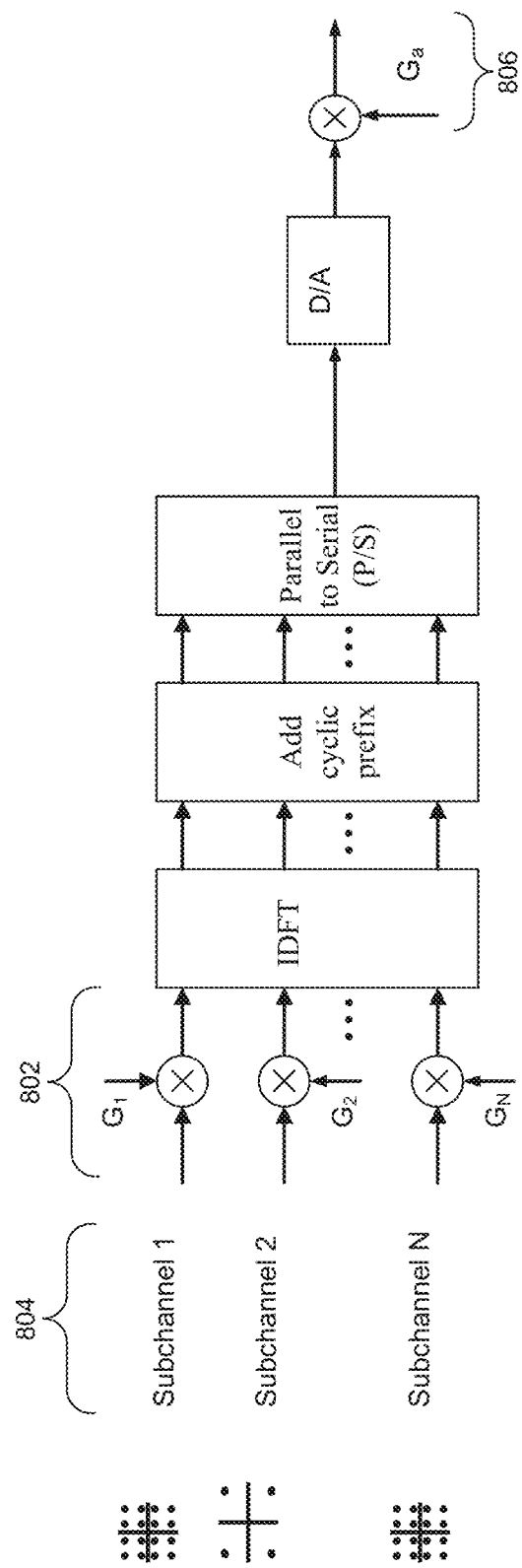
FIG. 8 illustrates a power control in AMCTP scheme for an OFDM system.

The power control can be user- or subchannel-based. FIG. 8 is an illustration of a power control in an OFDM system where digital variable gains 802 G1, G2 . . . GN are applied to subchannels 804 that may have different MCSs with different transmission power levels. Analog domain gain 806 Ga is used to control the total transmission power signal processes to meet the requirements of the transmission power of the device. In FIG. 8, after variable gains are applied to subchannels 804, they are inputted to the inverse discrete Fourier transform (IDFT) module. The outputs from the IDFT are the time domain signals, which are converted from parallel to sequential signals after a cyclic prefix is added to them.

Table 1 is an example of a general AMCTP table (or CQI table). It should be noted that some pilot patterns in the table can be the same. The total number of indexes used to represent different combinations of the joint adaptation process can be different for AMCTP index and CQI index. For instance, it is not necessary to send absolute transmission power information to the receiver(s). Some AMCTP information, such as relative power control or code rate, can be embedded in the data transmission instead of being conveyed in the AMCTP index.

TABLE 1

An example of general AMCTP.

| Index | Modulation | Code Rate | Training Pilot | Transmit Power |
|---|---|---|---|---|
| 1 | QPSK | 1/16 | Pattern 1 | + |
| 2 | QPSK | 1/8 | Pattern 2 | + |
| 3 | QPSK | 1/4 | Pattern 3 | + |
| 4 | QPSK | 1/2 | Pattern 4 | + |
| 5 | QPSK | 1/2 | Pattern 5 | + |
| 6 | 16QAM | 1/2 | Pattern 6 | + |
| 7 | 16QAM | 1/2 | Pattern 7 | + |
| 8 | 16QAM | 3/4 | Pattern 8 | + |
| 9 | 16QAM | 3/4 | Pattern 9 | + |
| 10 | 64QAM | 2/3 | Pattern 10 | + |
| 11 | 64QAM | 5/6 | Pattern 11 | + |
| 12 | 64QAM | 5/6 | Pattern 12 | Max-1x |
| 13 | 64QAM | 5/6 | Pattern 13 | Max-2x |
| 14 | 64QAM | 5/6 | Pattern 14 | Max-3x |

In a general AMCTP or CQI table, different training pilot patterns may be used for different modulations and code rates. However, even for the same modulation and coding, different patterns can be used to match different channel conditions. In order to make the table more efficient, more indexes can be allocated to the more frequently used scenarios. For example, several training pilot patterns can be allocated to the same MCS that is used more frequently, to achieve finer granularity and thus have a better match with different channel conditions.

Table 2 is a simple realization of the AMCTP index or the CQI index. In one embodiment, as shown in Table 2, the AMCTP and CQI index is Gray coded so that one bit error in the index makes the index shift to the adjacent index.

In some cases, a different number of pilot symbols is used for the same MCS. In one embodiment, to keep the packet size the same when the same MCS is used with a different number of pilot symbols, rate matching schemes such as repetition or puncturing is employed. For instance in Table 2, for Index 010 and Index 011, Pattern 3 has more pilot symbols compared to Pattern 2. The code rate of Index 010 is 1/2, which is punctured to 7/16 for Index 011 to accommodate the extra pilot symbols. In one embodiment, more significant bits in the CQI index are protected with stronger error protection code on the return channel.

TABLE 2

Another example of AMCTP or CQI table.

| Index (Gray coded) | Modulation | Code Rate | Training Pilot | Transmit Power |
|---|---|---|---|---|
| 000 | QPSK | 1/4 | Pattern 1 | Max |
| 010 | QPSK | 1/2 | Pattern 2 | Max |
| 011 | QPSK | 7/16 | Pattern 3 | Max |
| 001 | 16QAM | 1/2 | Pattern 2 | Max |
| 101 | 16QAM | 7/16 | Pattern 3 | Max |
| 111 | 64QAM | 2/3 | Pattern 2 | Max |
| 110 | 64QAM | 5/6 | Pattern 3 | Max |
| 100 | 64QAM | 5/6 | Pattern 3 | Max-X |

Other factors that can be used in the adaptation process include modulation constellation arrangements, transmitter antenna techniques, and subchannel configuration in a multi-carrier system.

For some modulation schemes such as 16 QAM and 64 QAM, how information bits are mapped to a symbol determines the modulation schemes' reliability. In one embodiment, constellation arrangement is adjusted in the adaptation process to achieve a better system performance, especially during retransmission in a hybrid ARQ process.

Some multiple antenna techniques, such as transmission diversity, are used to improve the transmission robustness against fading channel effects, whereas other multiple antenna techniques such as multiple-input multiple-output (MIMO) schemes are used to improve transmission throughput in favorable channel conditions. In one embodiment of the adaptive transmissions the antenna technique used for a transmission is determined by the adaptation process.

In a multi-carrier multi-cell communication system, when all subcarriers in one subchannel are adjacent or close to each other, they are more likely to fall in the coherent bandwidth of a fading channel; thus they can be allocated to users that are either fixed in location or are move slowly. On the other hand, when subcarriers and/or subchannels that belong to one user are scattered in the frequency domain, it results in higher diversity gains for the fast moving users, and a better interference averaging effect.

Given the fact that different configurations of subchannel compositions are suitable for different scenarios or user profiles, subchannel configuration is included in the transmission adaptation process. In one embodiment, the subchannel configuration information is broadcast on the common forward control channel to all users such that each user is informed of its subchannel configuration.

In another embodiment, the subchannel configuration is adjusted according to deployment scenarios. For instance, when a base station is newly deployed with less interference, one form of subchannel configuration is used, and when more users join the network or more adjacent base stations are deployed, which results in stronger interference to the users in the system, a different subchannel configuration with better interference averaging effect is used.

The following paragraphs describe a method of transmitting the control message between the transmitter and receiver, when the AMCTP scheme is implemented. A forward control link is defined here as the transmission of the AMCTP indicator from the transmitter to the receiver, and a return control channel is defined as the transmission of CQI, as the feedback information, from the receiver to the transmitter, as shown in FIG. 4.

The AMCTP indicator on the forward link can be sent either separately or jointly. For instance, the power control information, training pilot pattern indicator, or antenna diversity scheme can be embedded in the data transmission. In another embodiment, AMCTP is transmitted on a separate control channel with stronger error protection.

One way for the transmitter to obtain CQI is to have it explicitly sent from the receiver to the transmitter based on channel condition measurements at the receiver during previous transmission(s). The CQI is then used by the transmitter to determine what AMCTP scheme to use for the next transmission. In one embodiment, CQI for one user is periodically updated on the return channel, even when there is no forward transmission targeted for that user. In this case the receiver measures the channel conditions from the common broadcast transmission or the data transmission targeted to other users.

In one embodiment, the transmitter or the receiver uses any of several known predictive algorithms to predict current or future channel conditions based on previous channel measurements. This is more effective for a fast fading environment where the past measurements may not match the current transmission closely, due to the fast channel variations. The output of the predictive algorithm is then used by the adaptation process to select the best possible scheme for the current transmission.

Another method to obtain CQI is through the transmission of a probing sequence from the receiver to the transmitter on the return channel. In one embodiment, in a multi-carrier communication system, a probing sequence is transmitted from the receiver to the transmitter using an overlay scheme where the probing sequence is overlaid to the data traffic without having negative impact on the data transmission performance. In this case the transmitter estimates the channel profile in the time and/or frequency domains based on the received probing sequence. This is especially effective for TDD systems due to the reciprocity of the channel conditions on forward and reverse channels.

The AMCTP indicator or CQI can be sent per user or per subchannel. In one embodiment if per subchannel feedback is employed, since the AMCTP and CQI information for the same users are highly correlated, first the source coding is employed to compress the CQI, and then the error correction coding is applied to the compressed CQI to provide sufficient error protection.

In another embodiment, in hybrid ARQ retransmission, the transmitter may not use the requested CQI for the retransmission, while it may use the requested CQI for a new packet transmission. Instead, in this embodiment, it selects an AMCTP scheme that is appropriate for the retransmission at the same power level as in the previous transmission(s), in order to reduce interference with other users.

It should be pointed out that the AMCTP index used for the transmission from the transmitter to the receiver may be different from the CQI that the receiver requested, because the transmitter may have other considerations such as quality of service (QoS) for different users, network traffic load, and power allocation limit.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A transmission control method by a base station serving a plurality of mobile stations in a multi-carrier communication system, the communication system utilizing a transmission structure with time slots in the time domain and frequency subchannels in the frequency domain, the method comprising:
   determining a set of mobile station-based transmission parameters to be used for a subsequent transmission, the set of transmission parameters indicating a pilot pattern for one or more frequency subchannels utilized by the system, wherein the pilot pattern differs from one time slot to another and wherein the pilot pattern is based on channel conditions or other factors; and sending a control message to a mobile station, the control message providing information regarding the set of transmission parameters.

2. The method of claim 1, wherein the set of mobile station-based transmission parameters further comprises a modulation and coding scheme.

3. The method of claim 1, wherein the set of mobile station-based transmission parameters further comprises a multiple-input multiple-output (MIMO) scheme.

4. The method of claim 3, wherein the pilot pattern and the MIMO scheme are jointly adapted.

5. The method of claim 1, wherein the pilot pattern includes a number of pilot symbols.

6. The method of claim 1, wherein the pilot pattern includes locations of pilot symbols in time or frequency or space.

7. The method of claim 1, wherein the pilot pattern includes amplitudes and phases of pilot symbols.

8. The method of claim 1, wherein the other factors include a transmission antenna technique.

9. The method of claim 1, wherein the other factors include a subchannel configuration.

10. A transmission control method by a mobile station served by a base station in a multi-carrier communication system, the communication system utilizing a transmission structure with time slots in the time domain and frequency subchannels in the frequency domain, the method comprising:

receiving, at the mobile station, a control message from the serving base station, the control message providing information regarding a set of mobile station-based transmission parameters to be used for a subsequent transmission; and determining a pilot pattern for one or more frequency subchannels based on a pilot pattern indicator contained in the set of received transmission parameters, wherein the pilot pattern differs from one time slot to another and wherein the pilot pattern is based on channel conditions or other factors.

11. The method of claim 10, wherein the pilot pattern includes a number of pilot symbols.

12. The method of claim 10, wherein the pilot pattern includes locations of pilot symbols in time or frequency or space.

13. The method of claim 10, wherein the pilot pattern includes amplitudes and phases of pilot symbols.

14. A base station serving a plurality of mobile stations in a multi-carrier communication system, the communication system utilizing a transmission structure with time slots in the time domain and frequency subchannels in the frequency domain, the base station comprising:

a processor configured to determine a set of mobile station-based transmission parameters to be used for a subsequent transmission, the set of transmission parameters indicating a pilot pattern for one or more frequency subchannels utilized by the system, wherein the pilot pattern differs from one time slot to another and wherein the pilot pattern is based on channel conditions or other factors; and a transmitter configured to transmit a control message to a mobile station, the control message providing information regarding the set of transmission parameters.

15. The base station of claim 14, wherein the set of mobile station-based transmission parameters further comprises a multiple-input multiple-output (MIMO) scheme.

16. The base station of claim 15, wherein the pilot pattern and the MIMO scheme are jointly adapted.

17. The base station of claim 14, wherein the pilot pattern includes a number of pilot symbols.

18. The base station in claim 14, wherein the pilot pattern includes locations of pilot symbols in time or frequency or space.

19. The base station of claim 14, wherein the pilot pattern includes amplitudes and phases of pilot symbols.

20. The base station of claim 14, wherein the other factors include a transmission antenna technique.

21. The base station of claim 14, wherein the other factors include a subchannel configuration.

22. A mobile station served by a base station in a multi-carrier communication system, the communication system utilizing a transmission structure with time slots in the time domain and frequency subchannels in the frequency domain, the mobile station comprising:

a receiver configured to receive a control message from the serving base station, the control message providing information regarding a set of mobile station-based transmission parameters to be used for a subsequent transmission; and a processor configured to determine a pilot pattern for one or more frequency subchannels based on a pilot pattern indicator contained in the set of received transmission parameters, wherein the pilot pattern differs from one time slot to another and wherein the pilot pattern is based on channel conditions or other factors.

23. The mobile station of claim 22, wherein the pilot pattern includes a number of pilot symbols.

24. The mobile station of claim 22, wherein the pilot pattern includes locations of pilot symbols in time or frequency or space.

25. The mobile station of claim 22, wherein the pilot pattern includes amplitudes and phases of pilot symbols.

* * * * *